Jan. 25, 1955 E. ESTREMS 2,700,756

NUMBER COMPARING DEVICE FOR ACCOUNTING OR SIMILAR MACHINES

Filed Oct. 14, 1953

INVENTOR.
E. ESTREMS

BY J. W. Lowenitzer

ATTORNEY 2,700,756

NUMBER COMPARING DEVICE FOR ACCOUNTING OR SIMILAR MACHINES

Eugeni Estrems, St-Mande, France, assignor to International Business Machines Corporation, New York, N. Y., a corporation of New York Application October 14, 1953, Serial No. 385,991

Claims priority, application France April 29, 1953

7 Claims. (Cl. 340—149)

This invention relates to devices for comparing digits of amounts registered in electrical readout devices of a well known type.

Various forms of means for comparing two amounts registered in readouts of two accumulators or storage units have already been devised to determine the agreement or disagreement of digits in two amount representations in the case of storage units, or in the case of accumulator digits of two totals which may represent the totals of separate amounts entered in the respective accumulators.

Such comparing devices not only enable the detection of any error, which without such discernment might affect further calculations based upon such erroneous amounts, but they are also utilized to determine whether certain operation sequences should be carried out, the performance of which is dependent upon the equality or inequality of results in two storage units or accumulators.

Comparing devices previously devised to accomplish such determination for interconnected readouts have usually required a relatively long time to carry out a comparison of two amounts. This comparison is accomplished in the majority of arrangements by means of a 0–9 digit impulse emitter, the purpose of which is to attempt to complete an equality circuit for each of the ten digits which may be registered in each denominational order of the compared readouts.

Furthermore, some prior comparing devices required a large number of relays, or else alternatively they necessitated such complex devices that they often consisted of a duplication of the devices which were provided for registering the amounts.

The main object of the present invention is to provide an improved comparing device which enables the detection of an agreement or disagreement between amounts in two interconnected readouts in a much shorter time than has been possible heretofore. This is preferably accomplished by providing in the comparing devices a plurality of comparing circuits which are, in number, lower than the notation base of the registering system. For example, in the case of the decimal notation system there are provided only four comparing circuits instead of the ten comparing circuits usually used in prior comparing devices.

Another object of the present invention consists in providing comparing circuits operating according to a new mode of comparison which enables the immediate detection of any error consisting in the substitution for a certain digit belonging to a first "*n*" group of any digit belonging, in the case of the decimal system, to one of the 10–*n* digits. The groups of digits are so selected that the successive repetition of four similar comparing operations in which substitution of a digit in one group for a digit in another group is detected by the same process enables the detection of any disagreement between several groups of digits which are registered in storage units, readouts or accumulators.

Another object consists in providing sequence circuits enabling the successive completion of the aforementioned comparison circuits and within an extremely short period of time by means of the successive energization of relays or equivalent devices without delay and which successively complete the plurality of comparing circuits, and also connect said comparing circuits to a current supply and error signal means.

Another object of the present invention consists in providing circuits enabling the comparison of a group of digits with a group of other digits in two readouts by means of wiring all the digit contacts of each group together to enable a test circuit to be completed and indicate an error when the brush of one readout rests upon a digit contact which is different from the digit contact engaged by the brush of the other readout.

It is quite obvious that the present invention may be utilized not only for accumulators or their readouts of the decimal system but for accumulators having a different base of notation, since all that is required is a change in the number of tests and in the selection of groups of the digits and connections for the readouts in order to obtain a determination of the agreement or disagreement of amounts represented in accumulators or storage units.

Other objects of the invention will be pointed out in the following description and claims and illustrated in the accompanying drawings, which disclose, by way of example, the principle of the invention and the best mode, which has been contemplated, of applying that principle.

Figures 1, 2:
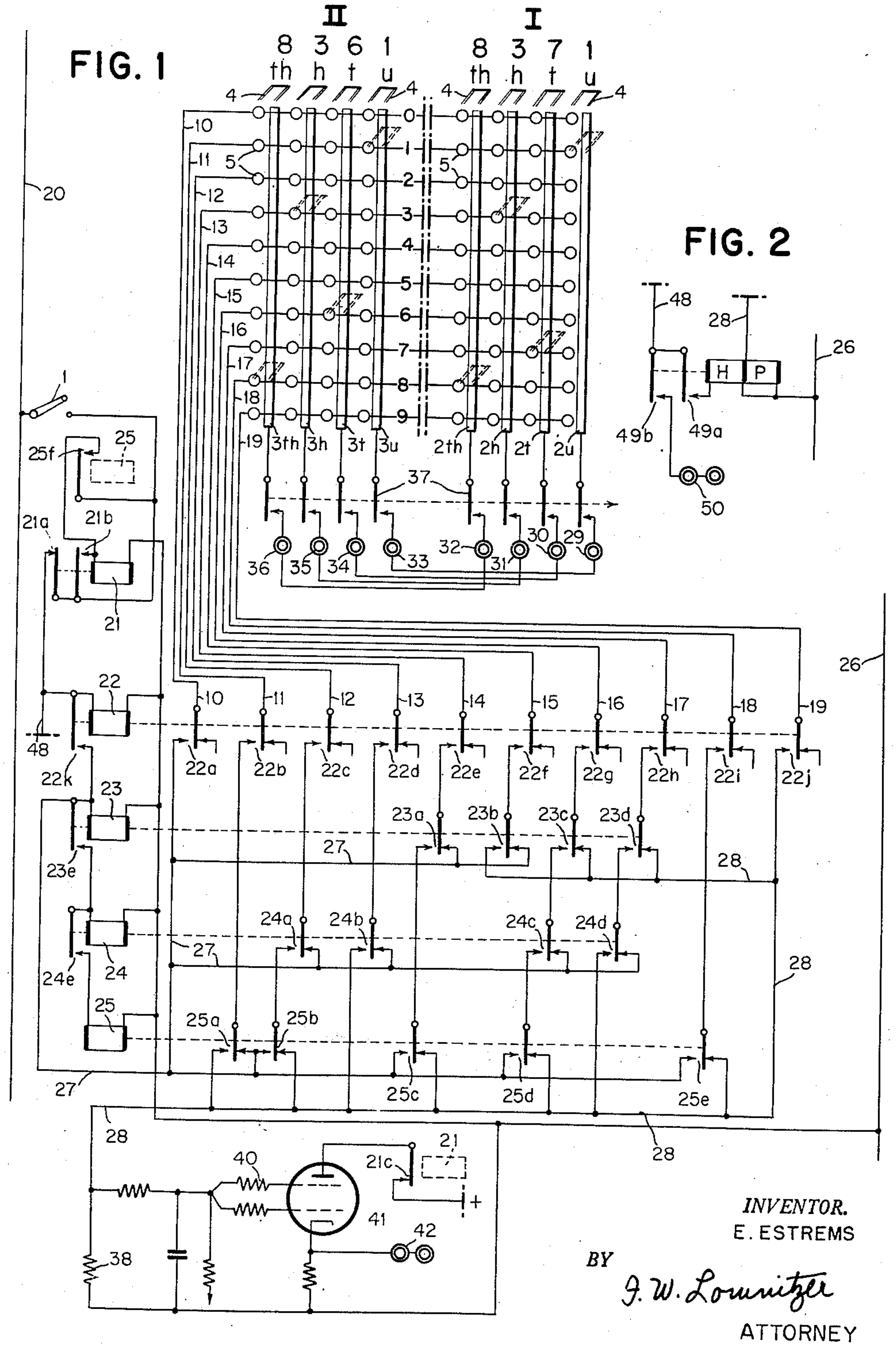
Fig. 1 shows the electrical circuits forming the preferred embodiment of the present invention.
Fig. 2 shows an additional circuit in which a high speed relay may be used as an error indicating device, instead of the tetrode of Fig. 1.

In order to facilitate an understanding of the present invention a short explanation will be given of the mode of operation carried out according to the present invention. To this end it will be assumed, for example, that readout I of an accumulator represents the number 8371 and in the corresponding denominational positions of the other readout II of a related accumulator there is represented the number 8361. There is obviously an error in the tens order in digits 6 and 7.

Comparison is carried out in four steps or stages. During the first step it is determined whether any of the digits 0, 1, 2, 3, 4 and 5 in each denominational order of one readout has been erroneously represented as either digit 6, 7, 8 or 9 in the corresponding denominational order of the readout of the other accumulator or vice versa. In this step there is no possibility of detecting a possible error in the substitution of digits 0, 1, 2, 3, 4 and 5 in said other readout of digits 6, 7, 8 and 9 in said one readout, due to the wiring connections. It follows in the numerical example selected that at the end of the first checking operation since digit 6 is not compared with digit 7 no discrepancy will be detected, although there is an error in the digits 6 and 7 in the tens denominational order of numbers 8361 and 8371.

On the other hand, if the amounts represented on the readouts II and I consisted of the amounts 8351 and 8371, respectively, or vice versa it will be seen that in the first step there would be an immediate detection of such discrepancy since in this first step of checking operation it is determined whether any digits 0, 1, 2, 3, 4 and 5 in any denominational order is erroneously represented in the amount to be compared by digits 6, 7, 8 and 9 in a corresponding order.

During the second step a comparison is made to determine whether any of the digits 0, 1, 2, 3, 6 and 7 has been erroneously represented by any or substituted for any digit in the group 4, 5, 8 and 9.

It follows, therefore, that in the selected example, that is a comparison of numbers 8361 and 8371, no error is detected because it is not determined in the second step whether digit 6 is substituted for digit 7. On the other hand, if the numerical values to be compared were 8331 and 8351 in the readouts II and I, or reversely, there would be an immediate detection of a disagreement in the second step because of the substitution of the erroneous digit 3 for the digit 5.

During the third step a further check is made to determine that none of the values 0 or 1 in any denominational order has been erroneously represented by the digits 2 to 9 inclusive. Therefore, in the assumed example consisting of numbers 8361 and 8371 there would still be no detection of a disagreement.

Finally, during the fourth step of operation the digits 0, 2, 4, 6 and 8 are compared with digits 1, 3, 5, 7 and 9 in order to check all errors resulting from the substitution of the digit 1 for the digit 0; the digit 3 for the digit 0; the digit 3 for the digit 2; 4 for 5; 6 for 7; 8 for 9; etc. some comprising pairs of digits which, up to the fourth step of operation, had not yet been compared. In the assumed example 8361 and 8371 there is a detection of a disagreement since there is a substitution of the digit 7 for the digit 6, or vice versa, depending upon the correct digit and hence it is determined in the fourth step of operation for the assumed example that the two compared numbers do not agree.

It is quite obvious that other groups of digits may be selected, as for example, instead of comparing in the first step a group of digits 0 to 5 with another group of digits 6 to 9, other arbitrary groups of digits could have been selected and permutations performed with them in order to obtain three other digit groups corresponding to the necessary comparisons performed during the remaining second, third and fourth steps of operation.

This mode of comparison may be also provided to compare accumulators accumulating according to the duo-decimal, quinary, etc. systems and in general to accumulators of various types, the number of steps of operation and groups of digits varying according to the base of notation.

*Construction of readouts*

As previously stated the amounts to be compared may be represented in readouts of two accumulators or storage units of the readout type and by way of illustration Fig. 1 shows settings of two amounts to be compared in electrical readouts of a type well known in the art. Two readouts I and II are shown which are set by their respective accumulators. For each denominational order there is provided a common contact strip 2 for readout I, there being four of such strips for four denominational orders *u, t, h* and *th*. A brush 4 for each order is adapted to be set by the related accumulator wheel so that it will selectively make contact with digit contact points 0–9, depending upon the digit representation in the accumulator wheel. Brush 4 for readout I, therefore, is adapted to make continuous contact with its associated contact strip 2 and one of the digit contact points 5.

In the readout II there is also provided for each order a common contact strip 3 and an associated brush 4 which is adapted to make contact with one of a series of 0–9 digit contact points 5. All of the contact points 5 having the same digit representation for the two readouts are interconnected. It will be seen that the wire 10 interconnects all of the 0 digit contact points of the two readouts; 11 interconnects the 1 digit contact points of the two readouts; 12 interconnects the 2 contact points, etc. The brushes 4 for the two readouts are also shown dotted in the positions they assume in each denominational order to represent the assumed amounts 8361 and 8371. Therefore, the brush 4 for the units order of readout I is shown in contact with its common conducting strip 2*u* and also digit contact point 1, brush 4 for the tens denominational order shown in contact with the digit contact point 7 and its associated common conducting strip 2*t*; brush 4 for the hundreds order rests upon 3 digit contact point and makes contact with its common conducting strip 2*h* and the brush 4 for the thousands order is shown making contact with the 8 digit contact point 5 and the associated common conducting strip 2*th*. Therefore, readout I represents 8371.

The brushes 4 for the four denominational orders of readout II are also shown in their dotted line positions to represent the amount 8361.

*First step of operation*

In the circuit diagram, lines 20 and 26 are the line sides of any suitable source of current. A comparing operation in initiated by the closure of the switch contacts 1 which may be of any suitable form such as timed cam contacts and closed in any suitable manner, which contacts upon closure complete a circuit from line 20, through said contacts 1, normally closed contacts 21*a*, multi-contact relay 22 to the line side 26. Upon energization of relay 22 it will transfer its respective contacts 22*a, b, c, d, e, f, g, h, i, j*. Relay 22 closes its contacts 22*k*, thereby connecting wire 27 to the line side 20 through contacts 21*a* and contacts 1. Transfer of contacts 22*a, b, c, d, e* and *f* connects wires 10, 11, 12, 13, 14 and 15 to wire 27 by circuits as follows: for wire 10: contact 22*a*; for wire 11: contact 22*b* and N/C contact 25*a*; for wire 12: contact 22*c* and N/C contact 24*a*; for wire 13: contact 22*d* and N/C contact 24*b*; for wire 14: contact 22*e* and N/C contact 23*a*; for wire 15: contact 22*f* and N/C contact 23*b*, N/C meaning "normally closed." Thus, all the digit contact points representing 0, 1, 2, 3, 4, and 5 consisting of one group are commonly connected through the above described circuits to wire 27, the latter being connected to the line side 20, through contacts 22*k* and contacts 1 as just described.

Transferred contacts 22*g, h, i* and *j* connect wires 16, 17, 18 and 19 to a wire 28 as follows: for wire 16: contacts 22*g* and N/C contacts 23*c*; for wire 17: contacts 22*h* and N/C contacts 23*d*; for wire 18: contacts 22*i* and N/C contacts 25*e*; for wire 19: contacts 22*j*.

It will be noted that the common contact strips 2*u*, 2*t*, 2*h*, 2*th* are connected to respective plug hubs 29, 30, 31 and 32 through respective contacts 37 and common contact strips 3*u*, 3*t*, 3*h*, 3*th* of readout II are connected to plug hubs 33, 34, 35 and 36 through respective contacts 37. Said contacts 37 may be closed in any suitable manner to the right when it is desired to carry out a comparing operation according to the present invention since when they are opened they allow entries to be independently effected in the accumulators so as to change the setting of the respective readouts. Therefore, when all of said contacts 37 are simultaneously closed it will be seen that the common contact strips of two readouts of the same denominational order are interconnected by wires joining the associated plug hubs. For example, common contact strip 2*u* is interconnected to common contact strip 3*u* in an obvious manner and the same follows for all of the other denominational orders of the readouts I and II.

It will be seen in the selective example that even though the amount representations are different in the tens order, brush 4 for the tens order of readout II resting on the 6 digit contact point and brush 4 for readout I resting on the 7 digit contact point will not effect an interconnection between wires 27 and 28. The reason is that while the digit settings are different in this order they are both in the same group 6–9 so that the discrepancy will not be located in the first step of the comparing operation.

If, however, the numbers were 8351 and 8361 the brush 4 for the tens order of readout II now rests on the 5 digit contact point and the brush 4 for the tens order of readout I rests on the 6 digit contact point so that it will be seen that brush settings for the same denominational order are in two different groups. Brush 4 for the tens denominational order of readout II represents 5 in the group 0–5 and the brush 4 for the tens order readout I rests on the digit contact point 6 which is in the group 6–9. With such settings a disagreement will be detected since the circuit will now be completed from line side 20, through contact 1, contacts 21*a*, 22*k*, wire 27, contacts 23*b* now normal, contacts 22*f* now transferred, wire 15, brush 4 of readout II now setting on the 5 digit contact and common conducting strip 3*t*, respective contact 37, connection linking hubs 34 and 30, through contact 37 from plug hub 30, common conducting strip 2*t*, brush 4 of the tens order of readout I now setting on strip 2*t* and the 6 digit contact point, wire 16, contacts 22*g* now transferred, contacts 23*c*, now normal, wire 28, resistor 38 to the line side 26.

It should be noted that the reverse setting in the tens order of the two readouts as in numbers 8361 and 8351 would also be indicated as a disagreement. The circuit would then be from wire 15 connected to wire 27, as just described, the 5 digit contact point engaged by brush 4 of readout I, 2*t* strip, contacts 37, interconnected plug hubs 30 and 34, contacts 37, 3*t* strip, brush 4 resting on 3*t* strip and 6 digit contact point of readout II, wire 16 connected as just described to wire 28. A disagreement will now be indicated because wires 27 and 28 are interlinked. Hence, even if 5 was substituted for 6, or a 6 for a 5, an error would be detected.

It follows then that for either example a circuit is completed between line sides 20 and 26 and consequently a voltage change is transmitted to grid 40 of an error signal tetrode 41 which, as a result of the voltage rise causes the tube to be conductive. Thus, a positive impulse may be derived from plug hubs 42 which may be used for any desired signal purposes, such as, for example, stopping the machine, punching, printing or further signalling the error indication.

It is, therefore, obvious that a disagreement between numbers 8361 and 8371 in which there is a change in the tens order, may not be detected in the first step because digits 6 and 7 are in the same group 6–9, the digit contact points of which are connected to the same wire 28. Thus, no circuit can be completed between line sides 20 and 26 so that during this first impulse there is no error indication and no output impulse to plug hub 42.

*Second comparing step*

When relay 22 is energized it is held energized through contacts 21*a* and contacts 1 back to the line side 20, it being observed that contacts 1 are retained closed in any suitable manner during a complete comparing operation. Therefore, for the three remaining steps of comparing contacts 22*a*–22*j* will be held transferred and contacts 22*k* will remain closed. Upon the closure of contacts 22*k* a circuit is extended from such contacts to relay 23 to the line side 26, thereby energizing relay 23. As will be explained later on relay 24 is picked up by closure of 23*e* relay contacts and relay 25 by closure of 24*e* contacts and therefore said relays 22, 23, 24 and 25 are energized in succession as the four successive steps of comparing are carried out. It will be noted that the full energization of each of these relays requires a certain time "*t*" so that after the closure of contact 22*k* "*t*" milliseconds are required for the full energization of relay 23. Thus, the period "*t*" is thus available to perform each test, this time being relatively long compared to the extremely short duration of each comparing impulse to render the tetrode 41 conductive. It follows, therefore, that all of the required operational safety is available without the requirement of any special means to delay the energization of relays 23, 24 or 25. However, such delay means may be incorporated if found desirable to do so.

Upon the energization of relay 23 the second step of comparison is initiated for determining whether any of the digits 0, 1, 2, 3, 6 and 7 in one group have been substituted for any of the digits 4, 5, 8 and 9 in another group, or vice versa. During the second comparison wires 10, 11, 12 and 13 are, as a result of the transfer of contacts 22*a*, *b*, *c* and *d*, connected to wire 27 by circuit connections previously described. Wires 16 and 17 which were formerly connected to wire 28 are now connected to wire 27, the circuit from wire 16 extending through 22*g* contacts now transferred, 23*c* contacts now transferred, normally closed contacts 24*c*, and wire 17 through contacts 22*h* now transferred, 23*d* now transferred and normally closed contacts 24*d*. Hence, it will be seen that during the second step of operation all of the wires 10, 11, 12, 13, 16 and 17 are connected to wire 27 and therefore interconnected digit contact points 0, 1, 2, 3, 6 and 7 constitute one group connected to wire 27.

The other group to be compared consists of interconnected digit contacts 4, 5, 8 and 9, the associated connecting wires 14, 15, 18 and 19 being connected to wire 28 as follows: The circuit from wire 14 extends through 22*e* relay contacts now transferred, 23*a* contacts now transferred and normally closed contacts 25*c* while the circuit from wire 15 extends through 22*f* relay contacts now transferred and 23*b* contacts now transferred. The circuits for connecting wires 18 and 19 to wire 28 are as has been previously described.

Therefore, in the assumed example even though 6 is represented in the tens order of the readout II, and 7 in the corresponding order of readout I, this disagreement will not be detected because the wires 16 and 17 and digit contacts 6 and 7 are connected to the same wire 28. On the other hand, if the brush 4 was setting on the 3 digit contact point in the tens order of readout I and the brush 4 was resting on the 5 digit contact point in the same order of readout II, this would be detected in the second comparing operation. A circuit would then be completed from the line 20, contacts 1, 21*a*, 22*k*, wire 27, normally closed contacts 24*b*, contacts 22*d* now transferred, line 13, brush 4 resting on the 3 digit contact point and the common conducting strip 3*t*, contact 37, hubs 30 and 34 now interlinked by a wire connection, contact 37, common conducting strip 2*t*, brush resting on the 5 digit contact, wire 15, contacts 22*f* now transferred, 23*b* now transferred, wire 28, resistor 38 to line side 26.

Since a disagreement has been detected a positive pulse is now directed to grid 40 of tube 41, thus causing an output impulse at the plug hub 42.

In the above example 3 and 5 were assumed to be represented on readouts II and I respectively. However, if the digits were interchanged so that 5 and 3 were represented on readouts II and I respectively, wires 27 and 28 would also be interlinked and error signal produced.

Summarizing, it is obvious therefore that during the second step of operation if a brush 4 in one order is setting on either one of a group of digit representations 0, 1, 2, 3, 6 and 7, an incorrect setting of the brush of the corresponding order in the other readout at any of the digit positions 4, 5, 8, 9 or vice versa will be detected.

When relay 23 is energized its hold circuit extends through 22*k*, 21*a* and the 1 contacts, back to the line side 20, thereby retaining relay 23 energized until the completion of the comparing operation. Relay 23 closes contacts 23*e*, thereby extending and completing the circuit through relay 24 to the line side 26. This initiates the third step of comparing operation and two groups of digit values in respective orders of the two readouts are compared as follows:

*Third comparing step*

Relay 24 is held energized by the holding circuit for relays 22 and 23 until completion of the comparing operation. In the third step of comparing it is determined whether 0–1 in one readout has been substituted for any of the digits 2, 3, 4, 5, 6, 7, 8 or 9 in the other readout, or vice versa. Accordingly, wires 10 and 11 are connected to the wire 27 and wires 12, 13, 14, 15, 16, 17, 18 and 19 to wire 28.

The connection from wire 10 to wire 27 is through contacts 22*a* now transferred and the connection from wire 11 to wire 27 is through normally closed contacts 25*a* and contacts 22*b* now transferred. The wires 12–19 are connected to the wire 28 through the following individual circuits: for wire 12: through 25*b* normal, 24*a* transferred, 22*c* transferred; for wire 13: through 24*b* contacts now transferred 22*d* contacts now transferred; for wire 14: through 25*c* contacts now normal, 23*a* now transferred, 22*e* now transferred; for wire 15: through 23*b* contacts now transferred, 22*f* contacts now transferred; for wire 16: to 25*d* contacts now normal, 24*c* contacts now transferred, 22*g* contacts now transferred; for wire 17: through 24*d* contacts now transferred, 23*d* contacts now transferred, 22*h* contacts now transferred; for wire 18: through 25*e* contacts now normal, 22*i* contacts now transferred; for wire 19: through 22*j* now transferred.

It will be seen that since brush 4 in readout II and the brush 4 in readout I are at respective digit positions 6 and 7 and the related 6 and 7 digit contacts are both connected by wires 16 and 17 to the same wire 28 there can be no interlinking of the wires 27 and 28 so that in this step it will not be determined that there are inconsistent digit representations 6 and 7 in the tens order of the two readouts. After this test, as a result of the closure of contacts 24*e*, relay 25 will be effective to transfer its contacts and said relay 25 will be held energized until the end of the comparing operation through the same hold circuits as for relays 22, 23 and 24. In this step of operation it is determined whether a group of digit representations 0, 2, 4, 6 and 8 in one readout is misrepresented by or substituted for any of the digit representations 1, 3, 5, 7 and 9 in the other readout, or vice versa, and accordingly wires 10, 12, 14, 16 and 18 are connected to the wire 27 and wires 11, 13, 15, 17 and 19 are connected to wire 28.

*Fourth comparing step*

After the third comparing impulse relay 25 is fully energized and said relay 25 transfers its *a*, *b*, *c*, *d* and *e* contacts. Wires 10, 12, 14, 16 and 18 are connected to the same wire 27 by the following circuits: for wire 10 through 22a transferred; for wire 12 through 25b transferred, 24a transferred, 22c transferred; for wire 14 through 25c transferred, 23a transferred, 22e transferred; for wire 16 through 25d transferred, 24c transferred, 23c transferred, 22g transferred; for wire 18 through 25e transferred, 22i transferred.

Wires 11, 13, 15, 17 and 19 are connected to wire 28 by the following circuits: for wire 11 through 25a transferred, 22b transferred; for wire 13 through 24b transferred, 22d transferred; for wire 15 through 23b transferred, 22f transferred; for wire 17 through 24d transferred, 23d transferred, 22h transferred; for wire 19 through 22j transferred.

During this step of operation the disagreement in the tens order of the two readouts is detected by a circuit completed as follows: Line side 20, contacts 1, 21a, 22k, wire 27, contacts 25d, 24c, 23c, 22g now transferred, wire 16, brush 4 of readout II resting on the 6 digit contact point, common conducting strip 3t, contact 37, interconnected hubs 34 and 30, contact 37, common conducting strip 2t, brush 4 of readout I now resting on the 7 digit contact, wire 17, the following transferred contacts 22h, 23d, 24d, thence by wire 28 through resistor 38 to the line side 26. The voltage rise thus produced by resistor 38 causes tetrode 41 to be conductive and an output impulse is applied to plug hub 42, thus indicating a disagreement in the two compared numbers 8361 and 8371.

After this comparing operation relay contacts 25f close, thereby completing an obvious circuit to relay 21, which latter is held through its respective hold contacts 21b and contacts 1 back to line side 20. Upon opening of contacts 21a the hold circuit for relays 22, 23, 24 and 25 is broken and said relays are deenergized and all four comparing circuits are now in their initial condition.

Fig. 2 shows the replacement of the tetrode 41 by a high speed relay 49 as an error signal means. Whenever wires 27 and 28 are interconnected a circuit extends through pickup coil of relay 49 to the line side 26. A hold circuit for the H coil is effected by the closure of relay contacts 49a, the hold circuit extending to wire 48 which, as shown in Fig. 1, is connected to the line side 20 through contacts 21a and contacts 1. Closure of contacts 49b connects the line side 20 to plug hubs 50, enabling the output impulse from plug hub 50 to be utilized for an indication of a disagreement.

It is understood that after the comparing operation and the use of an error impulse from either the plug hubs 42 or 50 contacts 1 are opened, thereby enabling the comparing circuits to be in their normal start condition for the next comparing operation.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a denominationally ordered number comparing device, the combination of two electrical readouts, each having for each order 0–9 digit representing means and an associated settable digit contact means, an error signal means, an electric current supply, means for interconnecting in succession the digit representing means of both readouts in a plurality of pairs of groups of digit representing means, said groups being so selected that in a plurality of comparing operations it may be determined whether the digit setting of the settable means in each order of one readout agrees or disagrees with the digit setting of the settable means of the same order of the other readout, and means for electrically connecting the pairs of groups of digit representing means and said settable means with said error signal means and current supply in succession to cause for each connected pair of groups of digit representing means the completion of a circuit to said error signal means when the digit setting of the settable means of one order of one readout disagrees with the digit setting of the settable means of the same order of the other readout.

2. In a denominationally ordered number comparing device, the combination of two electrical readouts, each having for each order 0–9 digit representing means and an associated settable digit contact means, an error signal means, an electric current supply, and means for interconnecting in succession from both readouts a plurality of pairs of groups of digit representing means, said groups being so selected that in a plurality of comparing operations it may be determined whether the digit setting of the settable means in each order of one readout agrees or disagrees with the digit setting of the settable means of the same order of the other readout and for electrically connecting the pairs of groups of digit representing means and said settable means with said error signal means and current supply in succession to establish a plurality of comparing circuits corresponding in number to the pairs of groups of digit representing means, said settable means causing the completion of any of said comparing circuits to said error signal means and said current supply when the setting of the settable means of one order of one readout disagrees with the digit setting of the settable means of the same order of the other readout.

3. In a denominationally ordered number comparing device, the combination of two electrical readouts, each having for each order 0–9 digit representing means and an associated settable digit contact means, an error signal means, an electric current supply, a plurality of relays having contacts for interconnecting the digit representing means of both readouts together as a plurality of different pairs of groups of digit representing means, said groups being so selected that in a plurality of comparing operations it may be determined whether the digit setting of the settable means in each order of one readout agrees or disagrees with the digit setting of the settable means of the same order of the other readout, means for energizing said relays in succession for electrically interconnecting the digit representing means in pairs of different groups, and means for connecting each interconnected pair of groups of digit representing means and said settable means with said error signal means and current supply to cause under control of said settable means and each pair of groups of digit representing means the completion of the circuit to said error signal means when the setting of the settable means of one order of one readout disagrees with the digit setting of the settable means of the other order of the other readout.

4. In a denominationally ordered number comparing device, the combination of two electrical readouts, each having for each order 0–9 digit representing means and an associated settable digit contact means, an error signal means, an electric current supply, means comprising a plurality of relays energized in succession for interconnecting in succession from both readouts a plurality of pairs of different groups of digit representing means, said groups being so selected that in a plurality of comparing operations it may be determined whether the digit setting of the settable means in each order of one readout agrees or disagrees with the digit setting of the settable means of the same order of the other readout, means for electrically connecting each pair of groups of digit representing means and said settable means with said error signal means and current supply to cause for each pair of groups of digit representing means the completion of the circuit to said error signal means when the setting of the settable means of one order of one readout disagrees with the digit setting of the settable means of the other order of the other readout, and means for energizing said relays in succession to effect said plurality of comparing operations.

5. In a number comparing device, the combination of two electrical readouts, said readouts comprising sets of digit contacts, one set for each denominational order, and for each denominational order a brush settable upon any digit contact, means for electrically connecting brushes of the same denominational order, a current supply, an error signal means, means for electrically connecting together one group of digit contacts in one readout, means for electrically connecting together other and different digit contacts in the other readout comprising another group for comparison with said one group of contacts, and means for connecting said current supply and said signal means to both of said connecting means in such manner as to complete a circuit to said error signal means through said digit contacts and brushes of the same order in the two readouts when one brush of one readout rests upon any digit contact of said one group and the other brush of the same order of the other readout rests upon any digit contact of said other group.

6. In a number comparing device, the combination of two denominationally ordered electrical readouts, said readouts comprising sets of digit contacts, one set for each denominational order, and for each denominational order a brush settable upon any digit contact of the related set, means for electrically connecting brushes of the same denominational order, a current supply, an error signal means, means for electrically connecting together one group of digit contacts of all denominational orders of the two readouts, means for electrically connecting together other and different digit contacts of all denominational orders of the two readouts comprising another group for comparison with said one group of contacts, and means for connecting said current supply and said signal means to both of said connecting means in such manner as to complete a circuit to said error signal means through said digit contacts and brushes of the same order in the two readouts when brush of one readout rests upon any digit contact of said one group and the other brush of the same order of the other readout rests upon any digit contact of said other group.

7. In a number comparing device, the combination of two denominationally ordered electrical readouts, said readouts comprising sets of digit contacts, one set for each denominational order, and for each denominational order a brush settable upon any digit contact of the related set, means for electrically connecting brushes of the same denominational order, a current supply, an error signal means, means for electrically connecting together in succession in all orders of the two readouts four different groups A, B, C and D of digit contacts, means for electrically connecting together in succession in all orders of the two readouts four other groups E, F, G and H of digit contacts for successive comparison with said A, B, C, D and E groups of contacts in the pairs A—E, B—F, C—G and D—H, and means for connecting said current supply and said signal means to the A and E, B and F, C and G, and D and H groups of contacts in the pairs designated and the pairs in succession in such manner as to complete a circuit to said error signal means through said digit contacts and brushes of the same order in the two readouts when one brush of any order of one readout rests upon any digit contact of the A, B, C or D group and the other brush of the same order of the other readout rests upon any digit contact of the E, F, G and H group, respectively.

References Cited in the file of this patent

FOREIGN PATENTS 335,198 Great Britain ---------- Sept. 19, 1930